United States Patent Office 3,221,000
Patented Nov. 30, 1965

3,221,000
PROCESS FOR THE MANUFACTURE OF
RUBBER DEGRADATION PRODUCTS
Hanns Dettenthaler and Gerhard Jung, Leverkusen, Germany, assignors to Farbenfabriken Bayer Aktiengesellschaft, Leverkusen, Germany, a corporation of Germany
No Drawing. Filed Aug. 22, 1961, Ser. No. 133,036
5 Claims. (Cl. 260—94.7)

For manufacturing chlorinated rubber, one proceeds from degraded rubber solutions which should have a very high concentration and a definite viscosity. It is known that solutions of rubber degradation products may be produced by dissolving rubber in solvents at elevated temperatures in the presence of oxygen or air or substances which give off oxygen, using catalysts such as metal compounds which act as oxygen carriers as well as peroxides and a solution of nitrosyl sulphuric acid in sulphuric acid. For carrying out this degradation on a technical scale, relatively long reaction times are required. Moreover, the degrees of viscosity of the solutions obtained are subject to great variations, depending on the types of rubber used. Furthermore, it is known that natural rubber and polyisoprene rubber may be degraded with sulphur chloride or substances which are capable of forming free radicals (such as alkylphenyl triazine, azo compounds and others), in the absence of oxygen or in an inert gas atmosphere.

It has now been found that the above mentioned variations and other disadvantages may be obviated and that rubber may be degraded in a particularly advantageous manner by treating in a solvent, in the presence of gases which contain oxygen or compounds which give off oxygen, with aromatic sulphonic acid hydrazides.

The aromatic sulphonic acid hydrazides may contain one or more sulphonic acid hydrazide groups and the aromatic radical may be substituted e.g. by halogen, nitro, amino or hydroxy groups. Examples of such compounds are benzene sulphohydrazide, toluene sulphohydrazide, o-chlorobenzene sulphohydrazide, o-nitrobenzene sulphohydrazide, p-phenol sulphohydrazide and benzene-1,3-disulphonic-acid-hydrazide.

The sulphonic acid hydrazides are added in quantities of 0.01–5% by weight, preferably 0.5–2% by weight calculated on the quantity of rubber.

To carry out the process, the catalyst is dispersed in the solvent, the rubber, e.g. natural rubber or polyisoprene rubber, is added, and the temperature is raised to 50–140° C., preferably 60–80° C., at the same time passing through oxygen or air or, if the reaction is carried out in a closed system, oxygen or air may be added under pressure until the rubber is completely dissolved and the desired viscosity of the solution has been reached. The viscosity may then be controlled by controlling the reaction time, or by controlling the quantity of catalyst added.

Suitable solvents for carrying out the process are halogenated hydrocarbons such as chloroform and carbon tetrachloride, and aromatic hydrocarbons, such as benzene, toluene and xylene; the quantities of solvent may be, for example, 6 to 25 times the quantity of rubber.

Example 1

0.3 part benzene sulphohydrazide is dispersed in 1,305 parts by weight of carbon tetrachloride. After adding 67 parts natural crepe rubber, the mixture is heated for 6 hours at 60° C., passing through a small quantity of air. After this time, a clear solution with a viscosity of 3.5 cst. at 25° C. has been formed.

Using the same reaction mixture except that benzene sulphonic acid hydrazide is replaced by 4 parts by weight of copper oleate, a solution having a viscosity of 218 centistokes at 25° C. is obtained after 8 hours.

Example 2

0.3 part by weight of benzene sulphohydrazide is dispersed in 1,305 parts by weight of carbon tetrachloride. After adding 67 parts natural crepe rubber and then adding air under a pressure of 1.6 atmospheres above atmospheric pressure, the reaction mixture is heated for 16 hours at 70° C. A clear solution is obtained, having a viscosity of 7.4 cst. at 25° C.

Example 3

0.6 part benzene-1,3-disulphonic acid hydrazide is dispersed in 1,307 parts of carbon tetrachloride. After adding 67 parts natural crepe rubber, the reaction mixture is heated at 60° C. for 10 hours. After this time, a clear solution is formed, having a viscosity of 12.2 cst. at 25° C.

The clear solutions obtained in Examples 1–3 are chlorinated at 20–50° C. by introducing 200–220 parts by weight of chlorine. To remove unreacted dissolved chlorine, about 50 parts by weight of the solvent are distilled off, and the chlorinated rubber is then precipitated by pouring the solution into methanol. The dried product, which has a chlorine content of 65–67% by weight, may be mixed with aromatic solvents such as toluene or xylene to give solutions which are suitable for applying with a brush or forming films with excellent properties.

Example 4

0.3 part benzene sulphonic acid hydrazide is dispersed in 1,305 parts by weight of carbon tetrachloride. After adding 67 parts polyisoprene and adding air under pressure, the reaction mixture is heated at 70° C. for 16 hours. A clear solution having a viscosity of 8.2 cst at 25° C. is obtained.

We claim:
1. A process for the manufacture of rubber degradation products comprising heating a rubber selected from the group consisting of natural and synthetic rubber in an organic solvent at a temperature within the range of about 60° C.–80° C. for about 6–16 hours in the presence of oxygen and .01–5% by weight of a catalyst selected from the group consisting of benzene sulphohydrazide, benzene-1,3-disulphonic acid hydrazide, toluene sulphohydrazide, o-chlorobenzene sulphohydrazide, o-nitrobenzene sulphohydrazide, p-phenol sulphohydrazide.

2. A process according to claim 1 wherein the organic solvent is a member selected from the group consisting of chloroform, carbon tetrachloride, benzene, toluene and xylene, and the quantity employed is about 6–25 times the quantity of rubber dissolved therein.

3. A process according to claim 1, wherein the rubber used is natural rubber.

4. A process according to claim 1, wherein the rubber used is polyisoprene rubber.

5. A solution of a rubber degradation product obtained by dissolving one part of a rubber selected from the group consisting of natural rubber and synthetic rubber in about 6 to 25 parts of an organic solvent selected from the group consisting of chloroform, carbon tetrachloride, benzene, toluene, and xylene, at a temperature of about 60° C.–80° C. for about 6–16 hours in the presence of oxygen and .01–5% by weight of a catalyst selected from the group consisting of benzene sulphohydrazide, benzene-1,3-disulphonic acid hydrazide, toluene sulphohydrazide, o-chlorobenzene sulphohydrazide, o-nitrobenzene sulphohydrazide, p-phenol sulphohydrazide.

References Cited by the Examiner

UNITED STATES PATENTS

| | | | |
|---|---|---|---|
| 2,621,161 | 12/1952 | Kulp et al. | 260—2.5 |
| 2,626,933 | 1/1953 | Lober et al. | 260—2.5 |

JOSEPH L. SCHOFER, *Primary Examiner.*

M. LIEBMAN, LEON J. BERCOVITZ, *Examiners.*